(No Model.)
G. CONSTABLE.
SAWING MACHINE.
No. 390,456.  Patented Oct. 2, 1888.
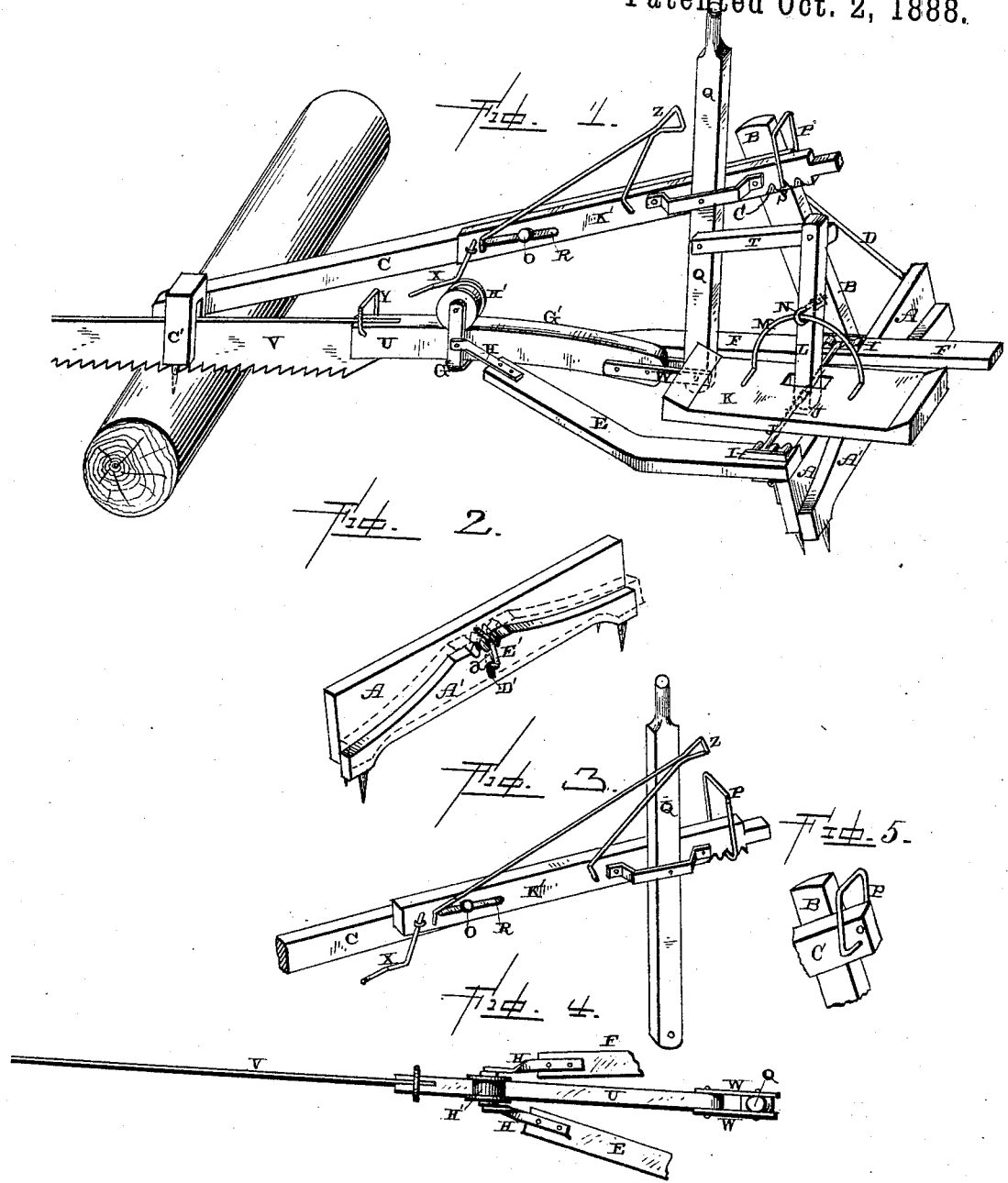
Witnesses.
L. F. Gardner
Allen J. Pattison
Inventor.
G. Constable,
per F. A. Lehmann,
Atty.

UNITED STATES PATENT OFFICE.

GORDEN CONSTABLE, OF CANNONSVILLE, NEW YORK.

SAWING-MACHINE.

SPECIFICATION forming part of Letters Patent No. 390,456, dated October 2, 1888.

Application filed May 11, 1888. Serial No. 273,565. (No model.)

*To all whom it may concern:*

Be it known that I, GORDEN CONSTABLE, of Cannonsville, in the county of Delaware and State of New York, have invented certain new and useful Improvements in Sawing-Machines; and I do hereby declare the following to be a full, clear, and exact description of the invention, such as will enable others skilled in the art to which it pertains to make and use it, reference being had to the accompanying drawings, which form part of this specification.

My invention relates to an improvement in sawing-machines; and its objects are to produce a sawing-machine in which both the weight of the operator and his arms are used at the same time as a power to reciprocate the saw; to so pivot the arms which guide the saw in its reciprocating movement and the treadle that the weight of the operator can be made to regulate the pressure of the saw upon the log; to make the operating-handle and the treadle adjustable, so as to suit the operator; to provide a means for preventing the saw from resting so heavily upon the object being sawed in its first movement as to make it difficult to start, and to provide an automatic adjustable base-block, so as to enable the saw to be used upon rough and uneven ground without the necessity of blocking the base, as is the case in machines heretofore constructed.

Figure 1 is a perspective of a machine embodying my invention. Fig. 2 is a detail view of the automatic base-block. Fig. 3 is a detached view of the adjustable slide and the operating-lever connected thereto. Fig. 4 is a detached plan view of the pitman and its guide. Fig. 5 is a detail view of the loop P.

The rigid portion of the frame of my machine consists of the horizontal base-block A, the vertical support B, and the forwardly-extending arm C, having the guide C' secured to its front end. The support B is braced in position by means of the brace-rod D, which is connected at its upper end to the support B and at its lower end to the base-block A. Pivoted at their rear ends upon the base block A are the two arms E F, which extend forward a suitable distance and are connected to the guide G by means of the plates H, and which arms form a frame. The two arms E F are separated at their rear ends a suitable distance to allow the treadle to be pivoted between them, and the arm E has its forward end bent inward and connected to the guide G, as shown. Placed upon the arms E F, just forward of their pivotal connections with the base-block A, are the notched plates I, which form bearings for the shaft J, which passes through the treadle K. The treadle K is provided with an opening, through which the upright L passes, and through which upright the shaft J also passes. Secured to the treadle K is a circular brace-rod, M, which extends upward and has the eyebolt N placed thereon, and which bolt passes through an aperture made in the upright L, and is secured by means of a nut placed upon its inner end, thus forming a clamp for the circular brace. By means of this brace-rod and the eyebolt the treadle K may be adjusted at any angle desired. The arm F has its rear end to extend a suitable distance back of the point at which it is pivoted to the block A, and which arms and lever F' afford a means by which the operator can raise the saw by placing his foot upon it.

Secured to the forwardly-projecting arm C by means of the bolt O, which passes through its front end and having its rear end passing through the loop P, is the adjustable bar K', near the rear end of which is pivoted the operating-lever Q. This adjustable bar K' has a slot, R, in its forward end, through which passes the bolt O, and its rear end provided with notches S, which catch in the loop P. This loop consists of a wire bent into an oblong shape, as shown, and has its ends secured in the arm C at its rear end, and is made sufficiently large to allow the rear end of the adjustable bar K' to pass between it and the arm C, its lower notched or toothed edge resting upon the lower inwardly-extending portion of the loop.

Loosely connected to the operating-lever Q, below the point at which it is pivoted to the adjustable bar K', is the connecting-rod T, which has its rear end loosely connected to the upright L. Passing through the guide G is the pitman U, to the forward end of which is connected the saw V in any suitable manner.

To the rear end of the pitman U are connected the plates W, between which the lower end of the operating-lever Q is pivoted. Extending downward and forward from the front end of the adjustable bar K' is the supporting-bar X, which catches in a loop, Y, which extends upward from the front end of the pitman U. Also connected to the adjustable bar K' is the handle Z, which extends backward therefrom within convenient reach of the operator, the pitman U reciprocating back and forth through the U-shaped guide G, and is provided with a wearing metal plate or strip, G', upon its upper edge for the roller H' to rest upon.

It will be readily understood that by adjusting the pivotal point of the shaft J back and forth upon the notched bearing-plates I (thus bringing more or less weight forward of the point at which the arms or frame is pivoted to the base-block A) the downward pressure applied to the saw by the roller H is regulated. By means of this construction downward pressure is applied to the saw through the arms or frame, guide G, roller H, the pitman U, and the weight of the operator. The saw is guided at its outer end by the slotted block C', secured to the front end of the arm C, and which block has suitable spikes or spurs placed in its lower end, and which are forced into the log or other material being sawed, whereby the log is prevented from turning when the saw is being moved back and forth. The base-block being also provided with teeth which enter the ground, both the machine and the log are firmly braced against any movement whatever when the machine is in operation.

The rod X is for the purpose of holding the saw up into the guiding-block C', when it is drawn backward for convenience in moving the machine around. This rod is gradually declined from its vertical portion, as shown, so that after the machine has been placed in position for work and the saw is being moved forward for the first time it allows the saw to gradually come in contact with the material being sawed and to be readily and easily started by preventing the saw from catching or sticking in its first movement, as would otherwise be the case. When the log is cut off, or nearly so, the operator by placing his foot upon the lever F' can raise the saw upward into the guide C', and at the same time pushing forward upon the operating-lever Q causes the rod X to enter the loop Y upon the forward end of the pitman, and thus firmly support the saw for convenience when moving the machine.

Secured to the base-block A is the pivoted automatic adjustable self-locking block A'. This block is preferably made of the shape here shown, and is provided with spikes or other suitable projecting points upon its lower edge, which enter the ground from the weight of the machine upon it.

Passing through an elongated opening, D', made in the block A' at its center near its lower edge, is the lower prong of the staple E', which is fastened to the base-block A', and the upper end of this staple E' passes over the upper edge of the block A', and is also secured to the base-block. The pivoted block A' has a suitable number of notches, a, formed in its upper edge at its center just under the upper prong of the staple, and which notches a engage the upper prong of the staple when the block A' is forced upward by the weight of the machine being placed upon it. When the rear end of the machine is lifted from the ground, this pivoted and vertically-adjustable block A' drops downward, disengaging the notches from the upper prong of the staple, allowing the block a free movement at either end. As the rear end of the machine is lowered, the block A', being free to move, adjusts itself to the unevenness of the ground as the machine is lowered in position, and is locked by the notches a engaging with the staple. This construction also allows the operator to adjust the machine at any angle desired, and which is held firmly in the adjusted position, as above described, thus enabling the material to be sawed at any desired angle to its horizontal plane.

The treadle K, being pivoted upon the shaft J, can be adjusted at any desired incline, so as to vary the position of the operator in relation to the operating-handle Q, by loosening the nut upon the end of the eyebolt or other suitable clamping device N, which allows the circular brace M to be moved therein, and thus the treadle adjusted to suit the convenience of the operator, and is securely held by the clamp N. By raising the rear end of the adjustable bar K' and disengaging the teeth S from the loop P it can be moved back and forth through the loop, thus bringing the operating-handle Q, pivoted to it, nearer to or farther from the operator, independently of the treadle and connecting-rods. It will readily be seen that this independent adjustment of the treadle and the operating-lever adapts the machine to be suited to persons of all heights and sizes and according to their individual option.

The operation of my machine is as follows: The saw being supported in the slotted guide C' by the rod H and the loop Y, and the guide C' secured to the log or other material by the spikes projecting therefrom, the operator places his left foot upon the front end of the treadle and his right foot upon the rear end, and places his left hand upon the handle Z, and with his right hand operates the handle Q. As the operator pulls the lever Q toward him his weight is naturally and necessarily placed upon the front end of the treadle, which, being connected with the operating-lever below its fulcrum or pivotal point, assists in drawing the lever toward him through the medium of the upright L and connecting-rod T, which forces the lower end of the operating-lever Q outward or from him, carrying with it the pitman and the saw connected thereto. In this position, the weight of the operator being upon the treadle K, downward pressure is applied to the saw through the arms E F and the rollers H' and holds the saw to its work; but when the operator pushes the lever Q from him his weight is necessarily placed upon the opposite end of the treadle, and which assists in drawing the saw backward.

Having thus described my invention, I claim—

1. In a sawing-machine, the combination of the horizontal base-block, having a forwardly-projecting arm which engages the material being sawed connected thereto at a suitable distance above it, a frame pivoted at its rear end upon the base-block, a guide secured to its front end, a treadle pivoted upon the arms, an operating-lever pivoted near its center to the forwardly-projecting arm, the treadle being connected by a rod to the operating-handle below its pivotal point, a pitman secured at its inner end to the lower end of the operating-lever, and the saw secured to the pitman, whereby the weight of the operator upon the treadle and the force applied to the upper end of the operating-lever are made to reciprocate the saw, substantially as shown.

2. In a sawing-machine, the combination of the base-block, having a forwardly projecting arm secured thereto at a suitable distance above it, a frame pivoted at its rear end upon the base-block, a guide secured at its front end, a treadle pivoted upon the frame at a point in front of that point at which the frame is pivoted to the base-block, an operating-lever pivoted near its center to the forwardly-projecting arm, the treadle connected by a rod to the operating-handle below its pivotal point, a pitman secured to the operating-lever at its lower end, and the saw which passes through the guide, whereby the weight of the operator upon the treadle causes a downward pressure upon the saw when moving forward, but which is removed when the saw moves backward, for the purpose set forth.

3. The combination of the base-block, having a forwardly-projecting arm which engages the material being sawed secured thereto at a suitable distance above it, a frame pivoted at its rear end upon the base-block, a guide secured to its front end, and bearing-plates secured to the frame near its rear end, said plates having a series of bearings, a treadle pivoted thereon, whereby the pivotal point of the treadle can be adjusted back and forth upon the frame for the purpose described, an operating-lever pivoted to the forwardly-projecting arm, the treadle connected to the operating-handle below its pivotal point, the pitman, and the saw which passes through the guide, substantially as specified.

4. The combination of the forwardly-projecting arm, the operating-handle pivoted thereto, the pitman secured to the lower end of the handle, the base-block, the pivoted treadle having an upright, a circular bar extending upward therefrom, a clamp for clamping the circular bar to the upright, whereby the treadle can be adjusted at any desired incline, a rod connecting the operating-handle and the upright, and a frame upon which the treadle is pivoted, substantially as described.

5. In a sawing-machine, the combination of the base-block, the frame pivoted thereto at its rear end and having a guide at its front end, through which the pitman or saw passes, the foot-lever extending to the rear of the pivotal point of the frame, and an operating-lever for reciprocating the saw, whereby by pressure upon the foot-lever the saw is raised upward, for the purpose specified.

6. In a sawing-machine, the combination of the frame, the operating-handle pivoted thereto, the saw secured to the handle, a forwardly-projecting rod secured to the frame above the saw, and a loop secured to the saw or its pitman, with which the forwardly-projecting rod engages when the saw is drawn backward and supports it in relation to the frame when the machine is being moved, substantially as described.

7. In a sawing-machine, the combination of the frame, the operating-handle pivoted thereto, the saw attached to the lower end of the handle, a loop secured to the saw or its pitman, and a rod having its upper end secured to the machine-frame, and that portion which engages with the loop inclined downward and forward, whereby when the saw is moved forward it gradually engages the material being sawed, for the purpose set forth.

8. The combination of the base-block, the frame pivoted thereto at its rear end, the treadle pivoted upon the frame, a forwardly-projecting arm which engages the material being sawed, a sliding adjustable bar secured to the forwardly-projecting arm, and to which the operating-lever is pivoted, whereby the lever can be adjusted in relation to the treadle, and the operating-lever, to which the saw is connected, and which is also connected with the treadle, substantially as specified.

9. The combination of the base-block, having a forwardly-projecting arm which engages the material being sawed secured thereto at a suitable distance above it, forwardly-projecting arms pivoted at their rear ends upon the base-block, and a treadle pivoted upon the arms by means of a shaft, a vertical support, also secured to the shaft, a vertical circular brace secured to the treadle, and a clamp for securing the circular brace to the vertical support at any desired point, whereby the treadle may be adjusted, an operating-handle pivoted upon the forwardly-projecting arm C, a rod pivoted to the operating-lever and to the vertical support, the pitman, and the saw, substantially as shown.

10. The combination of the base-block, the arms E F, pivoted thereto at their rear ends, the treadle pivoted upon the arms, the U-shaped guide G, having a roller journaled in its upper end, the forwardly-projecting arm secured to the base-block at a suitable distance above it, the sliding adjustable bar provided with a slot at its front end, a bolt passing through the slot and into the arm, the loop P, secured to the rear end of the arm C, through which the rear end of the sliding bar passes, the said bar having teeth for engaging the loop, the handle Z, rigidly secured to the sliding bar, and the operating-handle pivoted to the sliding bar near its center and connected to the treadle below its pivotal point, and the saw connected to the lever at its lower end, all combined and arranged to operate in the manner substantially as shown and described.

In testimony whereof I affix my signature in presence of two witnesses.

GORDEN CONSTABLE.

Witnesses:
MILTON W. OWENS,
WILLIAM E. HENDERSON.